April 9, 1963   R. C. WEST ETAL   3,084,743
SECONDARY RECOVERY OF PETROLEUM
Filed Sept. 16, 1958
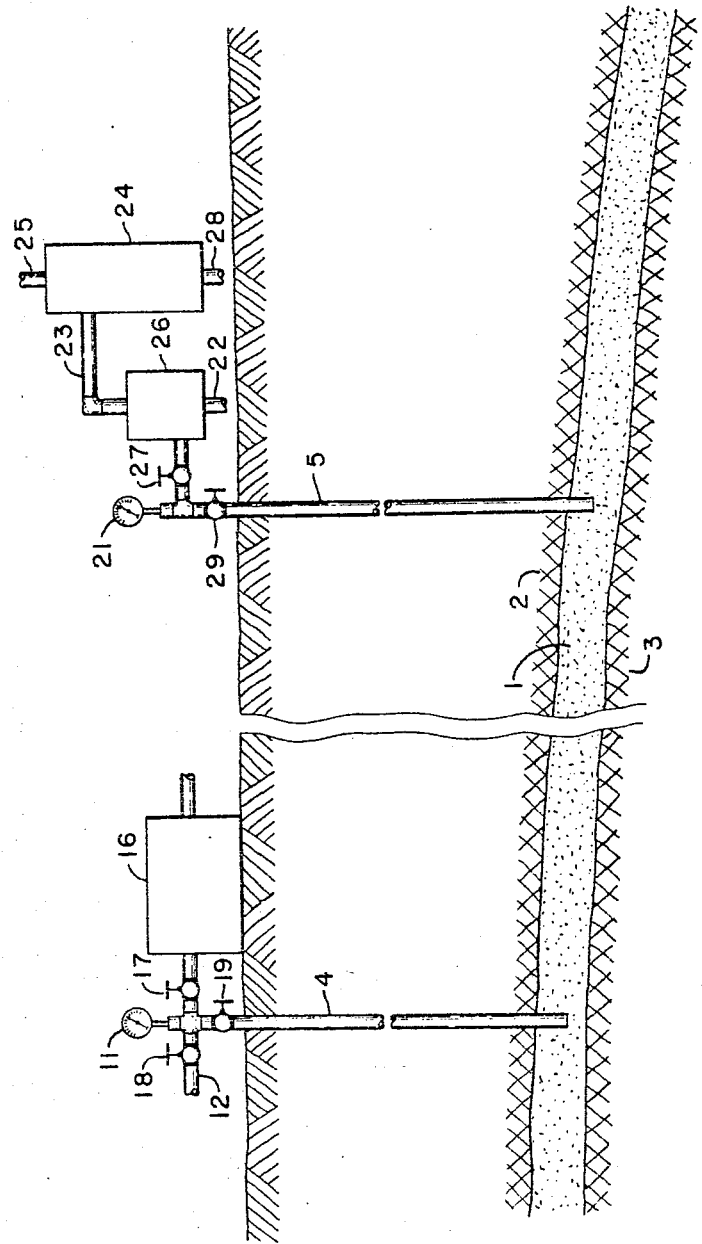
Robert C. West
Gerald D. Ortloff
Donald M. Beeson   Inventors
By *James A. Reilly*   Attorney

United States Patent Office 3,084,743
Patented Apr. 9, 1963

3,084,743
SECONDARY RECOVERY OF PETROLEUM
Robert C. West, Gerald D. Ortloff, and Donald M. Beeson, Tulsa, Okla., assignors to Jersey Production Research Company, a corporation of Delaware
Filed Sept. 16, 1958, Ser. No. 761,313
5 Claims. (Cl. 166—9)

This invention relates to the secondary recovery of petroleum from subterranean formations and more particularly to an improved process for recovering oil which involves the injection of a fluid comprising gaseous or liquified carbon dioxide into an oil reservoir from which production by conventional methods has decreased to a stage where further recovery by such methods is no longer profitable.

In normal oil production techniques during a first or primary recovery period, natural earth pressures are relied upon to cause the production of oil. Primary recovery can be continued until the pressure existent in the reservoir is so depleted that economic oil recovery can no longer be obtained. In general, however, primary recovery techniques can secure production of only twenty to twenty-five percent of oil in a reservoir. In order to increase recovery, a variety of secondary recovery processes have been employed. Usually, a drive fluid such as water is injected into the reservoir through an injection well so as to drive oil through the oil-bearing strata to a production well. The present invention, which is concerned with this general technique of employing a fluid drive, provides an improved process which comprises the injection of carbon dioxide to force oil from a hydrocarbon bearing formation.

While the general principles of secondary recovery processes have long been appreciated, practical difficulties exist which have seriously limited the value of known procedures. The principal problem has been that oil displacement in a reservoir by a driving fluid is normally inefficient. For example, by the use of water, which has been the most common driving fluid which has been employed in secondary recovery procedures, it usually has been impossible to recover some fifty percent of the oil originally contained in a reservoir. More recently, oil recovery has been increased by a method involving injection of air, natural gas, or other gaseous hydrocarbon into some of the wells in a producing field and the production of oil from adjacent wells.

Generally, where a gas drive is employed in a partially depleted underground reservoir, the viscosity ratio of the oil phase to the gaseous phase is of the order of from about fifty to one to several hundred to one. This great difference in viscosity between the driving gas and the oil in the reservoir is believed to cause a large proportion of the gas to bypass the oil. The method also leads to excessive gas to oil ratios at the producing well and makes the conventional process inefficient, since there must be considerable recycling of the driving gas to effect appreciable recovery of oil. In an effort to overcome the above problems, various gases have been injected into a well under pressure to establish a bank of gas at high pressure or a bank of liquid into which some oil will dissolve. Heretofore, however, in order to build up a high pressure bank of gas, or liquified gas, continuous pumping of the compressible fluid for several days or even for many months has been necessary.

The present invention relates to a novel secondary recovery technique in which a gas comprising carbon dioxide is employed in a unique manner thereby utilizing the peculiar properties of carbon dioxide in the recovery of oil from underground reservoirs. It is equally applicable to the recovery of both high- and low-viscosity crude oil. Specifically, this invention provides an improved secondary recovery process using carbon dioxide wherein a bank of fluid comprising carbon dioxide is injected into a partially depleted reservoir to establish a pressure of at least 1000 p.s.i. and preferably one in the range of 1000 to 4000 p.s.i. Thereafter, an aqueous medium is injected into the reservoir to cause the carbon dioxide in contact with oil contained therein to pass through said reservoir while the above pressure is maintained on the reservoir. Finally, as an integral step in the novel process which has been discovered, injection of the aqueous medium is ceased and the reservoir is depressured to atmospheric pressure by pumping down the production well.

In a preferred embodiment of the present invention, an oil-bearing reservoir to be treated in accordance with the novel process is first brought under substantially hydraulic control and a static pressure of at least 1000 p.s.i. is exerted upon water in fluid communication with the oil-bearing reservoir. In some instances a reservoir which previously has been waterflooded will be treated. Alternately, it may be necessary to inject water until fill-up occurs. After the reservoir has been put under substantially hydraulic control, the reservoir mean pressure is raised to 1000 p.s.i. or above, and a limited bank of a fluid comprising gaseous or liquified carbon dioxide is injected at a pressure which is at least 1000 p.s.i. Thereafter, an aqueous fluid or simply more water is injected until economic limit to cause the bank of carbon dioxide to pass through the reservoir in contact with the oil contained therein and the reservoir is then depressured. In an alternate embodiment, wherein an oil-bearing reservoir already contains water at a pressure in excess of 1000 p.s.i., the initial step of the process is the injection of the carbon dioxide containing gas.

In accordance with the present invention, the secondary recovery of oil from a depleted or partially depleted reservoir is efficiently carried out by injecting carbon dioxide into a reservoir under pressure. It has been observed that when carbon dioxide and crude petroleum are placed in equilibrium at high pressure and after a pressure of about 1000 p.s.i. is exceeded, a point is reached where additional carbon dioxide will not dissolve in the liquid phase but instead a portion of the crude oil enters the second and separate phase which is predominately carbon dioxide. Thus, two immiscible phases are formed, one mostly hydrocarbons with carbon dioxide dissolved therein, and the other mostly carbon dioxide with hydrocarbons dissolved therein. The present invention makes use of this phenomenon for recovering additional oil from a reservoir and in a preferred embodiment avoids both the problem of having the gas bypass the oil in a partially depleted reservoir, and the problem involved in the tedious and costly pumping required to raise the pressure of a compressible fluid such as carbon dioxide to the exceedingly high pressures required to obtain the unique properties of carbon dioxide for oil recovery. The surprising discovery has been that by means of the present process it is possible to achieve a degree of oil recovery not heretofore available.

Broadly, this invention is directed to a novel method for recovering oil from a partially depleted subterranean oil-bearing strata having an injection well and a producing well in comunication therewith, wherein gas comprising carbon dioxide is injected into and swept through the reservoir under conditions such that the amount of oil recovered is in excess of that possible by any of the heretofore known methods of primary and secondary recovery. In accordance with one embodiment of the invention an oil-bearing stratum is flooded with water following which static pressure in excess of 1000 p.s.i. is exerted upon the water in fluid communication with the oil-bearing stratum.

In the range of 0.03 to 0.50 pore volume of a fluid comprising gaseous or liquified carbon dioxide is then injected through the injection well into the stratum at a pressure in excess of 1000 p.s.i. and is caused to be passed through the stratum in contact with the oil contained therein to force the oil from the reservoir in the manner described hereinafter, preferably without decreasing substantially the reservoir pressure, but in any event without decreasing the reservoir pressure below 1000 p.s.i. Thereafter, the reservoir is depressured and oil forced from the reservoir by the injected gas which is driven through the formation by waterflooding is removed to the surface of the earth through a producing well.

Preferably, the inert gas comprising carbon dioxide which is utilized in accordance with the present invention contains in the range of 50 to 100 percent carbon dioxide. Where the supply of carbon dioxide is limited, and a pure gas is not employed, nitrogen, flue gas, air or a hydrocarbon gas can be mixed with the available carbon dioxide and an injection gas containing in the range of 50 to 100 percent carbon dioxide can be employed in accordance with the invention.

Further, in accordance with the present process, operating pressures must be at least 1000 p.s.i. The upper pressure limit is restricted by the operating pressure readily obtainable by use of conventional equipment and of course ultimately by the formation breakdown pressure. Preferably, pressures in the range of 1000 to 4000 p.s.i. are employed. The injection of a carbon dioxide containing gas is continued only until a predetermined volume which preferably is in the range of 0.05 to 0.25 pore volume has been introduced into the reservoir. At that time injection of carbon dioxide containing gas is discontinued and injection of an aqueous driving fluid is commenced. This aqueous driving fluid likewise is injected into the reservoir at a pressure in excess of 1000 p.s.i. and preferably at substantially the same pressure as the carbon dioxide.

Advantageously, a driving fluid which is a low solubility fluid, comprising essentially water, is employed to cause the bank or slug of carbon dioxide to pass through the reservoir. In some instances, however, it may be desirable to add a viscosity increasing agent to at least the initial portion of the driving fluid to thereby adjust the viscosity so as to be of the order of or greater than that of the oil to be recovered. Conventional surface active agents and emulsifiers can also be employed. The aqueous driving fluid functions to drive or force the carbon dioxide through the reservoir in contact with the oil contained therein without substantially decreasing the reservoir pressure. As a final step in the process of the present invention, additional oil is recovered at the end of the carbon dioxide flood by releasing the back pressure and depressuring the reservoir by pumping down the production well.

Further objects and features of the invention and the preferred manner in which it is to be performed will be more readily apparent from the accompanying description in connection with the drawing in which the single FIGURE shows schematically the method of injecting an aqueous fluid and then carbon dioxide into an injection well and recovering oil swept from the strata through a producing well.

With particular reference to the drawing, a partially depleted subterranean oil-bearing stratum 1 is depicted isolated by impervious strata 2 and 3. At least two wells, an injection well 4 and a producing well 5, have been drilled into the producing stratum. Initially, water is introduced into the formation through injection well 4 and the reservoir flooded in the conventional manner until water fill-up occurs. Water is introduced under suitable pressure indicated on gauge 11 from line 12 through valves 18 and 19 until the pressure at both injection well 4 and producing well 5 reaches at least 1000 pounds per square inch. A suitable back pressure indicated on pressure gauge 21 is maintained at the production well 5.

Thereafter, carbon dioxide from a suitable source is introduced into compressor 16 and from there passes under pressure through valves 17 and 19 into injection well 4. The carbon dioxide bank is then driven by water through the oil producing stratum to producing well 5 from which is removed a mixture of water, carbon dioxide and hydrocarbons picked up by the carbon dioxide by virtue of the phenomenon referred to above. The mixture is conducted through valves 29 and 27 into separator 26 wherein a portion of the hydrocarbons is removed by partially reducing the pressure. Separated hydrocarbons are recovered from separator 26 through line 22. The mixture of carbon dioxide and unseparated hydrocarbons is passed overhead from the separator through line 23 into stripping tower 24 which may be of conventional design. Here further separation of hydrocarbons from the carbon dioxide occurs. Carbon dioxide leaving stripper 24 through line 25 can be injected into other injection wells, not shown. Hydrocarbons recovered in stripping tower 24 are removed through line 28.

At all times when either carbon dioxide or aqueous driving fluid such as water is being injected into the reservoir, the reservoir at the production well is maintained preferably at a pressure of the same order of magnitude as at the injection well but sufficiently below the injection pressure so as to permit oil to flow through the reservoir. The oil caused to flow through the reservoir by the injected gas is removed to the surface of the earth through the producing well. Injection of aqueous fluid is continued until oil and carbon dioxide no longer flow from the reservoir in substantial quantities. At that time, injection of aqueous fluid is ceased and the back pressure is released through valve 29 to produce additional oil as the reservoir approaches atmospheric pressure and recovery of oil in accordance with this embodiment of the invention is completed by the pumping down of the production well.

In conducting the improved method of oil recovery involving a combination of waterflooding, carbon dioxide injection, waterflooding, and depressuring in accordance with the present invention, carbon dioxide is introduced into injection well 4 as previously described while the pressure at producing well 5 is maintained at least 1000 p.s.i. Preferably, fluid production from the reservoir is restricted during the injection of the carbon dioxide containing gas so that the pressure in the reservoir can be maintained at least 1000 p.s.i. Following the injection of the limited bank of carbon dioxide, water or an aqueous medium is injected and continued until the ratio of water to oil flowing from the separator has reached an economic limit, such as for example, 25 barrels per barrel.

By pore volume as used herein, is meant the pore volume in that portion of the reservoir through which the injected carbon dioxide passes in flowing from injection well to the producing well. The pore volume can be determined with sufficient accuracy for the purpose of this invention in accordance with the procedures well known in the industry from certain information obtained by established investigating methods. Such procedures are so well known in the art that a description thereof is unnecessary.

The most advantageous volume of carbon dioxide to be introduced into the reservoir can be ascertained by laboratory experiments on a core under conditions simulating recovery of oil from a subterranean oil reservoir in accordance with conventional procedures. It is to be understood that the quantity of carbon dioxide required is influenced by various factors, such as for example, composition of injection gas and reservoir oil, injection pressure, and the composition of the aqueous driving fluid. The volume required for conditions normally encountered in the field is from 0.03 to 0.5 pore volume and can be determined in the conventional manner in the laboratory using an artificial reservoir. In accordance with the present invention, in the range of 0.05 to 0.25 pore volume of the gas comprising carbon dioxide is most advantageously employed.

In accordance with the present discovery, when carbon dioxide is injected into and driven through a waterflooded oil reservoir upon which there is exerted a static pressure of 1000 p.s.i. or above, there is an unexpected increase in the amount of oil that can be recovered over that recoverable by heretofore known methods of oil production, with a corresponding decrease in the residual oil in the reservoir. Further, additional oil can be recovered at the end of the carbon dioxide flood when the reservoir is blown down or depressured. The above has been demonstrated by experiments carried out on linear laboratory models under conditions simulating a subterranean oil reservoir in accordance with conventional laboratory practice. The following example illustrates the amount of oil that can be recovered from a reservoir by means of the present invention.

EXAMPLE 1

In a series of tests, crude oil was displaced from sandstone models by the process of the present invention. The models were cylinders two inches in diameter having a length in the range of from 1 to 18 feet. The sandstone cylinders were centered in steel tubes of 2¼ inch I.D. and the annular space between the sandstone and the tube wall was filled with a low-melting point alloy which expands on freezing. A tight seal was thus obtained at the surface of the cylinder. Fluid inlets and outlets were located at opposite ends of the model.

The flooding experiments were carried out at a pressure level of approximately 1000 p.s.i. at room temperature with pressures maintained by the use of regulators at the producing outlets. Initially, the sandstone "reservoirs" were saturated with crude oil and connate or "interstitial" water. The injection system was a motor-driven direct-reading, constant-rate hydraulic pump, which displaced fluid from a high-pressure container into the model. Commercial carbon dioxide of greater than 99% purity employed in liquid state was maintained at 80° F. during the tests.

After the desired volume of water had been injected, in the range of 0.05 to 0.25 pore volume of carbon dioxide was injected into the sandstone reservoirs. Thereafter, the carbon dioxide container was replaced by a cell containing water, and water injection was started again at linear rates of fluid advance until the producing water-oil ratio reached a value of 20. At that point, water injection was discontinued and the back pressure on the model outlets was released. The produced fluids were discharged through the pressure regulator into a liquid-gas separator and the quantity of oil, water, and gas produced was measured. Overall material balance checks made on the oil production data by extracting residual oil from the models and determining residual oil by distillation and by infra red analysis confirmed the accuracy of the results.

A summary of experimental results obtained on Loudon crude oil—Weiler sandstone systems is shown in Table I. Loudon crude oil has a viscosity of approximately 6 cp. at 70° F. and an API gravity of 38°. The Weiler sandstone possessed a porosity of approximately 20 percent and a permeability in the range of 50 to 150 md. All test cores used in this example initially contained about 26% pore volume (PV) of connate water and 74% PV of Loudon crude oil. Table I illustrates oil recovery obtained with the process of the present invention (Experiment D), compared with that obtained by primary recovery alone (Experiment A), and by a waterflooding secondary process (Experiment B). Oil recovery obtainable by driving a 0.20 PV bank of carbon dioxide at 1000 p.s.i. through a test core with waterflooding wherein the core has not previously been water pressurized to 1000 p.s.i. is shown in Experiment C.

Table I

| Experiment | Process | Total Oil Recovery (percent) (based on oil initially in place) |
|---|---|---|
| A | Gas Drive alone (Simulated Primary Recovery). | 41 |
| B | Secondary Water Flooding (Repressured to 1,000 p.s.i.) | 49 |
| C | 0.20 PV carbon dioxide at 1,000 p.s.i. followed by waterflood. | 60 |
| D | Present Process (0.20 PV carbon dioxide) | 71 |

From the above, it is clearly seen that the present process comprising exerting static pressure of at least 1000 p.s.i. upon an aqueous medium in fluid communication with an oil bearing reservoir, then injecting in the range of 0.05 to 0.25 pore volume of carbon dioxide, thereafter driving the bank of gas with an aqueous medium to sweep oil through the reservoir and finally depressuring the reservoir to atmospheric pressure, results in recovery substantially in excess of that recovered by waterflood. By this novel sequence of operations, approximately 71 percent of the oil in place was produced.

EXAMPLE 2

Further data on other systems in which the present invention was tested in the manner of Example 1 are given below. The experimental studies dealt with the recovery of both high-viscosity and low viscosity crude oil. In the heavy oil tests, Ada crude oil was displaced from Torpedo sandstone models. This sandstone is a mildly water-wet material having porosity in the range of 20 to 28 percent and permeability in the range of 500 to 1500 md. Ada crude oil is an aromatic base crude, high in asphaltenes.

Table II
LINEAR MODEL EXPERIMENTS—ADA CRUDE OIL—TORPEDO SANDSTONE

| Experiment Number | Length (Ft.) | Approx. $k$ air (md.) | $\phi^*$, Percent | Initial Oil Satn. (Percent PV) | Connate Water Satn. (Percent PV) | Experiment Description | Oil Recovery, Fraction of Oil Initially in Place | | | Percent Increase Over Reference Waterflood Recovery |
|---|---|---|---|---|---|---|---|---|---|---|
| | | | | | | | By Flood | By Blow-Down | Total | |
| 1 | 15 | 500 | 20.1 | 75.0 | 25.0 | Waterflood | 0.29 | | 0.29 | |
| 2 | 18 | 500 | 20.4 | 72.8 | 27.2 | Water-driven 0.17 PV liquid carbon dioxide bank. | 0.52 | 0.13 | 0.65 | 125 |
| 3 | 1 | 1,500 | 27.6 | 82.4 | 17.6 | Waterflood | 0.39 | | 0.39 | |
| 4 | 17 | 1,500 | 26.8 | 80.3 | 19.7 | Water-driven 0.09 PV liquid carbon dioxide bank. | 0.59 | 0.14 | 0.73 | 87 |
| 5 | 1 | 1,500 | 27.6 | 75.5 | 24.5 | Waterflood of 180 cp. oil to simulate waterflood of Ada crude at 100° F. | 0.42 | | 0.42 | |
| 6 | 17 | 1,500 | 26.8 | 79.2 | 20.8 | Water-driven 0.08 PV gaseous carbon dioxide bank at 100° F. | 0.50 | 0.11 | 0.61 | 45 |

*Porosity.

Its viscosity at 70° F. is approximately 400 cp. The data of Tables II and III further illustrate the amount of oil that can be recovered from a reservoir by means of the present invention.

*Table III*

LINEAR MODEL EXPERIMENTS—LOUDON CRUDE OIL—WEILER SANDSTONE

| Experiment Number | Model Description | | | | | Displacement Type | Oil Recovery. Fraction of Oil Initially in Place | | | | Percent Increase Over Reference Waterflood Recovery |
|---|---|---|---|---|---|---|---|---|---|---|---|
| | Length (Ft.) | Approx. $k$ air (md.) | $\phi$ (Percent) | Initial Oil Satn. (Percent PV) | Connate Water Satn. (Percent PV) | | By Waterflood | By Injection | By Blowdown | Total | |
| 10 | 16 | 75 | 20.0 | 74.0 | 26.0 | Waterflood | 0.42 | | | 0.42 | |
| 11 | 16 | 75 | 20.0 | 74.0 | 26.0 | Present Process 0.2 PV $CO_2$ Bank. | | 0.57 | 0.14 | 0.71 | 69 |

The above results clearly show that in the water-driven carbon dioxide process a considerable quantity of oil is produced by depressuring the reservoir after flooding has been stopped at a high water-oil ratio. This recovery is referred to as "blow-down" recovery. It can be seen that oil produced during blow-down represents a surprising part of the total recovery.

A thorough experimental investigation of the blow-down recovery was made. The results of these experiments, as described below, clearly show that the oil recovery by blow-down is not merely a laboratory phenomenon, but would contribute to oil production during a field operation.

It was first considered that at least part of the blow-down recovery might be the result of a capillary end effect prevailing during the flood, causing a severe pile-up of oil near the model outlets. In subsequent tests with banks of carbon dioxide, the flooding rate was increased sharply during the final stages of flooding. In no case was any change in the producing water-oil ratio observed. These results preclude the possibility of an end effect due to capillary forces.

Further observations indicated that the length of the model and the rate of blow-down had no significant effect on the blow-down oil recovery. The recoveries of Ada crude oil obtained with water-driven banks of carbon dioxide over a range of model lengths and blow-down rates are presented in Table IV.

injecting water into a subsurface oil-bearing reservoir through at least one injection well until a mean reservoir pressure of at least 1000 p.s.i. is attained, injecting a bank of from about 0.03 to about 0.5 pore volume, based on reservoir conditions, of normally gaseous fluid comprising carbon dioxide into said reservoir through said injection well at a pressure in excess of 1000 p.s.i., injecting an aqueous medium into said reservoir through said injection well to displace said bank of fluid toward at least one production well, withdrawing produced fluids from said production well while maintaining a mean reservoir pressure of at least 1000 p.s.i.; discontinuing the injection of said aqueous medium when the producing fluids no longer contain substantial quantities of oil and carbon dioxide, and thereafter depressuring said reservoir by pumping down said production well and recovering additional oil from said production well.

2. A process as defined by claim 1 wherein said bank of normally gaseous fluid is a bank of gaseous carbon dioxide.

3. An improved oil recovery process which comprises injecting water into a subsurface oil-bearing reservoir through at least one injection well until a mean reservoir pressure of at least 1000 p.s.i. is attained, injecting a bank of from about 0.03 to about 0.5 pore volume, based on reservoir conditions, of carbon dioxide into said reservoir through said injection well at a pressure in excess of 1000 p.s.i., injecting water into said reservoir through said injection well to displace said bank of carbon dioxide toward at least one production well, withdrawing produced fluids from said production well while maintaining a mean reservoir pressure of at least 1000 p.s.i., discontinuing the

*Table IV*

EFFECT OF RATE OF BLOW-DOWN AND MODEL LENGTH ON OIL RECOVERY—LINEAR TORPEDO MODELS—ADA CRUDE OIL WATER-DRIVEN 0.17 PV $CO_2$ BANK FLOODS

| Experiment No. | Model Description | | | | | Blow-Down Rate (Time Required to Complete Blow-Down) | Oil Recovery, Fraction of Oil Initially in Place | | |
|---|---|---|---|---|---|---|---|---|---|
| | Length (Ft.) | $\phi$ (Percent) | Approx. $k$ air (md.) | Initial Oil Satn. (Percent PV) | Connate Water Satn. (Percent PV) | | By Flood | By Blow-Down | Total |
| 14 | 1 | 20.3 | 500 | 79.6 | 20.4 | Fast (3 hours) | 0.505 | 0.127 | 0.632 |
| 5 | 18 | 20.4 | 500 | 72.8 | 27.2 | Fast (1½ days) | 0.525 | 0.124 | 0.649 |
| 15 | 18 | 20.4 | 500 | 70.8 | 29.2 | Slow (60 days) | 0.520 | 0.122 | 0.642 |

While in the foregoing there has been shown and described the preferred embodiment of this invention, it is to be understood that minor changes in details of construction, combination and arrangement of parts may be resorted to without departing from the spirit and scope of the invention as claimed. For example, whereas only a single injection and production well are depicted herein, two or more such wells may be utilized as desired.

What is claimed is:

1. An improved oil recovery process which comprises injection of water at said injection well after the producing fluids at said production well reach a high water-to-oil ratio; thereafter reducing the reservoir pressure to a level below 1,000 p.s.i. by pumping down said production well, and recovering fluids having a reduced water-to-oil ratio.

4. A process as defined by claim 3 wherein a bank of from about 0.05 to about 0.25 pore volume, based on reservoir conditions, of carbon dioxide is injected into said reservoir.

5. A process as defined by claim 3 wherein the injection of water to displace said carbon dioxide is discontinued after the water-to-oil ratio of the producing fluids at said production well reaches about 25:1.

References Cited in the file of this patent

UNITED STATES PATENTS

| | | |
|---|---|---|
| 1,511,067 | Russell | Oct. 7, 1924 |
| 2,623,596 | Whorton et al. | Dec. 30, 1952 |
| 2,669,307 | Mulholland et al. | Feb. 16, 1954 |
| 2,875,831 | Martin et al. | Mar. 3, 1959 |
| 2,875,832 | Martin et al. | Mar. 3, 1959 |
| 2,875,833 | Martin | Mar. 3, 1959 |
| 2,878,874 | Allen | Mar. 24, 1959 |

FOREIGN PATENTS

| | | |
|---|---|---|
| 669,216 | Great Britain | Mar. 26, 1952 |
| 696,524 | Great Britain | Sept. 2, 1953 |

OTHER REFERENCES

Uren: Petroleum Production Engineering, Exploitation, 2nd Edition, published by McGraw-Hill Book Company of New York, 1939, pages 423 to 426.